United States Patent
Harbaugh

(10) Patent No.: US 9,237,692 B2
(45) Date of Patent: Jan. 19, 2016

(54) PLANTER WITH SNAP-IN RIM INSERT

(75) Inventor: Kenneth A. Harbaugh, Villa Rica, GA (US)

(73) Assignee: ATT SOUTHERN INC., Camp Hill, PA (US)

( * ) Notice: Subject to any disclaimer, the term of this patent is extended or adjusted under 35 U.S.C. 154(b) by 513 days.

(21) Appl. No.: 13/479,828

(22) Filed: May 24, 2012

(65) Prior Publication Data

US 2013/0133252 A1    May 30, 2013

Related U.S. Application Data

(60) Provisional application No. 61/489,519, filed on May 24, 2011.

(51) Int. Cl.
*A01G 9/02* (2006.01)

(52) U.S. Cl.
CPC ............. *A01G 9/02* (2013.01); *Y10T 29/49826* (2015.01); *Y10T 156/10* (2015.01)

(58) Field of Classification Search
CPC .......... B65D 7/48; B65D 21/083; B65D 7/24; B65D 7/12; B65D 11/1833; B65D 11/18; B65D 85/52; A01G 9/02
USPC ......... 47/65.5, 66.1; 220/4.03, 640, 642, 643, 220/654, 691, 682
See application file for complete search history.

(56) References Cited

U.S. PATENT DOCUMENTS

| | | | | |
|---|---|---|---|---|
| 3,318,496 A | * | 5/1967 | Ayotte | B65D 47/123 |
| | | | | 215/227 |
| 3,627,037 A | * | 12/1971 | Carr, Jr. | F04D 25/166 |
| | | | | 165/122 |
| 4,585,136 A | * | 4/1986 | Clark | B29C 70/86 |
| | | | | 220/288 |
| 4,771,911 A | * | 9/1988 | Morony et al. | 220/592.16 |
| 4,772,418 A | * | 9/1988 | Leoncavallo | 422/310 |
| 6,170,691 B1 | * | 1/2001 | Morris et al. | 220/304 |
| 6,360,484 B1 | * | 3/2002 | Kreizel | 47/65.5 |
| 7,886,484 B1 | * | 2/2011 | Chen | 47/65.5 |
| 2008/0271370 A1 | * | 11/2008 | Moskowitz | 47/66.1 |
| 2011/0056130 A1 | * | 3/2011 | Wang | 47/65.5 |

FOREIGN PATENT DOCUMENTS

| | | |
|---|---|---|
| DE | 122725446 A1 | 12/1978 |
| EP | 0410190 A1 | 7/1990 |
| EP | 1110870 A1 | 6/2001 |
| GB | 2349790 | 11/2000 |

* cited by examiner

*Primary Examiner* — Son T Nguyen
(74) *Attorney, Agent, or Firm* — Eckert Seamans Cherin & Mellott, LLC; David C. Jenkins

(57) ABSTRACT

A molded planter includes a container and a separate rim insert for providing the appearance of a wide upper rim. The rim insert is configured to snap fit into the upper annular edge of the container. When the rim insert and container are assembled, the upper annular edge of the container extends to or above the upper surface of the rim insert such that there is no visible seam between the container and rim insert when the planter is viewed from the side.

11 Claims, 8 Drawing Sheets

US 9,237,692 B2

PLANTER WITH SNAP-IN RIM INSERT

CROSS REFERENCE TO RELATED APPLICATION

This application claims priority under 35 U.S.C. §119(e) to U.S. Provisional Patent Application Ser. No. 61/489,519, filed May 24, 2011, entitled PLANTER WITH SNAP-IN RIM INSERT.

BACKGROUND OF THE INVENTION

1. Field of the Invention

The present invention relates generally to containers configured to hold potting soil for growing a plant therein. More specifically, the invention relates to molded planters comprising a container with a separate rim insert to present the appearance of a wide upper rim.

2. Background Information

Planters and flowerpots made from clay, or other traditional materials, often had a thick upper edge; this configuration added strength to the upper edge. Molded plastic planters, or planters made from other molded materials, do not have to have the same configuration as plastic tends to be a more robust material, i.e. plastic is not prone to chipping. Still, for aesthetic reasons, a wider upper edge is a preferred configuration for a planter. One method of creating the appearance that a molded planter had a wide upper edge provided a rolled over upper edge. When viewed from below the elevation of the rolled edge, however, the hollowness of the edge, as well as unsightly ribs, could be seen. Further, as users typically lift the planter by the rim, the thin rolled edge could be painful to lift, especially with heavy planters. This undesirable configuration is the result of the molding techniques used to make the planters. That is, the upper edge could not be rolled completely over, as such a configuration could not be made on a separable mold. Further, support ribs were required to strengthen the rolled edge.

The solution to the problem of an unappealing upper edge was to cover the hollow, rolled edge with an enclosing member, generally identified as a snap-fit rim. Typically, the snap-fit rim had the same cross-sectional shape as the planter and would coupled to the planter immediately adjacent the rim. Thus, a snap-fit rim enclosed the space defined by the rolled edge as well as the support ribs. This configuration approximated traditional planters and the elements, i.e. a planter body and a rim, could easily be made from molded plastic or other molded materials. Typically, the molded materials used for the planter body and the rim were the same, so that the elements would not appear to be distinct. That is, it is desirable to create the appearance that the planter was a unitary element, similar to a traditional planter.

Snap-fit rims generally include at least one flange or a groove that would interface with and engage a corresponding groove or flange on the planter. Snap-fit rims would be coupled to the planter either from above or below. For example, as shown in U.S. Pat. No. 6,360,484, a rim structured to cover the bottom of a rolled planter edge would have generally the same cross-sectional shape as the rolled edge and would be positioned by passing the lower portion of the planter body through the rim. The rim would have an axial flange/groove structured to engage an axial groove/flange on the rolled edge of the planter. The rim may have further included a radial flange/groove structured to engage an axial groove/flange on the side of the planter. A "flange" on the side of a tapered planter body includes a chamfered, or non-tapered, portion of the planter body sidewall. While this configuration enclosed the rolled edge, the seams between the planter body and the rim were still visible when the planter was viewed from the side.

There are also "top down" rims, i.e. a rim installed from above the planter, such as the assembly shown in EP Patent No. 1,110,870. As shown, the planter body upper portion includes a radial bulge and an edge that is rolled inwardly so as to terminate in a horizontal flange. The rim includes a vertical sidewall of a sufficient size to cover the "bulge" so that the inner surface of the planter was mostly smooth. Further, the rim includes an upper horizontal flange and a series of lower, parallel "ramps" whereby a horizontal groove is formed therebetween. The planter body horizontal flange was disposed in the rim horizontal groove. In this configuration, most of the rim was disposed inside the planter body, but the seam between the rim and planter body was still visible from the side. That is, the rim flange extended above the planter body flange and was visible.

SUMMARY OF THE INVENTION

The disclosed and claimed embodiments provide for a planter including a container having a side wall with an upper surface, a rim insert having a sidewall and a flange with an upper surface and a lower surface, the rim insert being configured to snap fit into the container, wherein, when the rim insert and container are assembled, the container sidewall upper surface extends either substantially flush with or above the upper surface of the rim insert, and whereby there is no seam between the container and rim insert that is visible from the side of the container.

Further, the disclosed and claimed embodiments provide for a planter including a container having a side wall with an upper surface, a rim insert having a sidewall and a flange with an upper surface and a lower surface, the container having at least one upwardly facing recess, the rim insert having at least one downwardly protruding structure, the rim insert at least one downwardly protruding structure sized to fit within the container at least one upwardly facing recess, and wherein the rim insert is configured to be coupled to the container via a downward motion.

Further, the disclosed and claimed concept provides for a method of making a planter, as described above, including the steps of vertically aligning the rim insert at least one downwardly protruding structure with the container at least one upwardly facing recess, and, moving the rim insert downwardly into the container until the rim insert at least one downwardly protruding structure is disposed within the container at least one upwardly facing recess.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
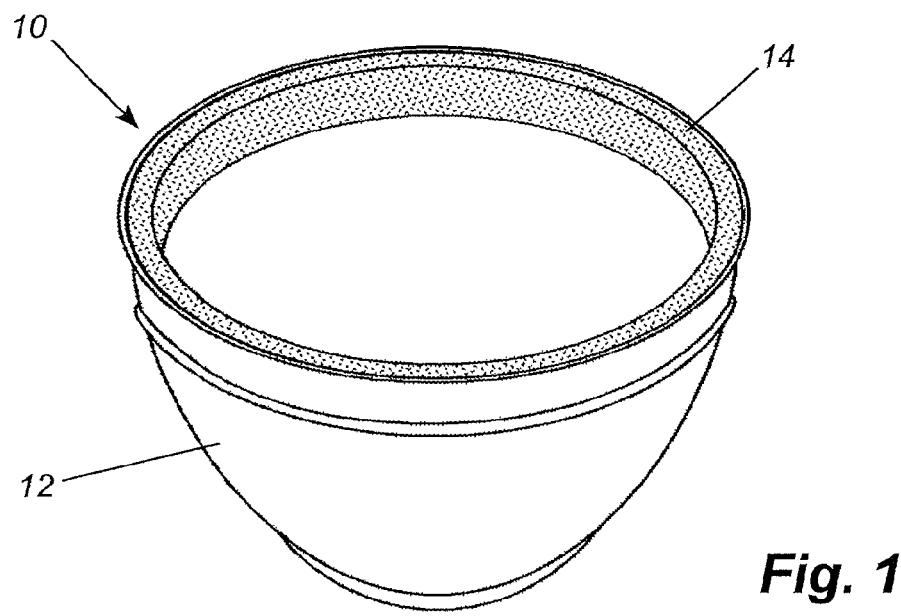
FIG. 1 is a perspective view of a planter comprising a container and rim.

Referring now to the drawings, in which like numerals indicate like elements throughout the several views, FIG. 1 illustrates a planter according to a disclosed embodiment. The planter 10 comprises a container 12 and a rim insert 14 (also hereinafter "ring insert 14"). The container 12 is generally concave and is designed to hold potting soil and a plant. The rim insert 14 snaps into the upper end of the container 12 to provide the desirable appearance of a wide upper rim. In FIG. 1 only, the rim insert 14 is shaded for ease in distinguishing between the rim insert 14 and the container 12; however, in practice the rim insert 14 and container 12 will generally be molded from the same material and in the same color.

Figure 2:
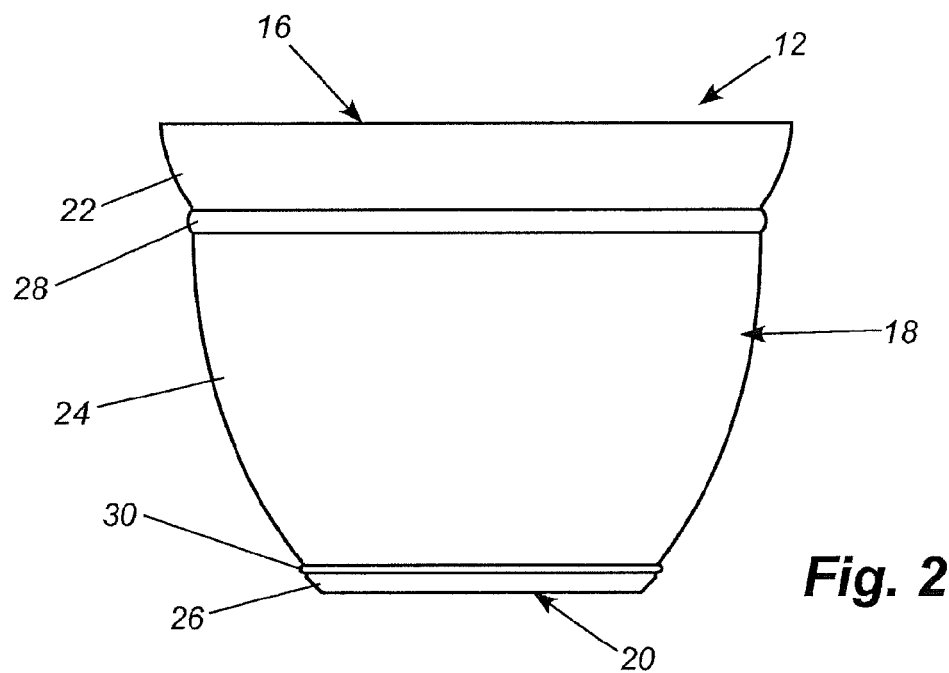
FIG. 2 is a side view of the container of the planter of FIG. 1.
Figure 3:
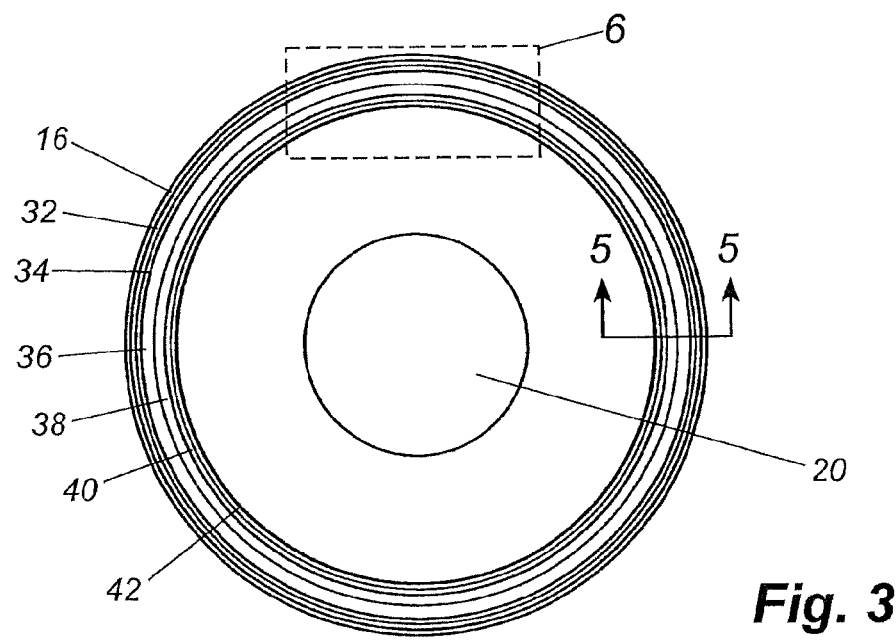
FIG. 3 is a top view of the container of FIG. 2
Figure 4:
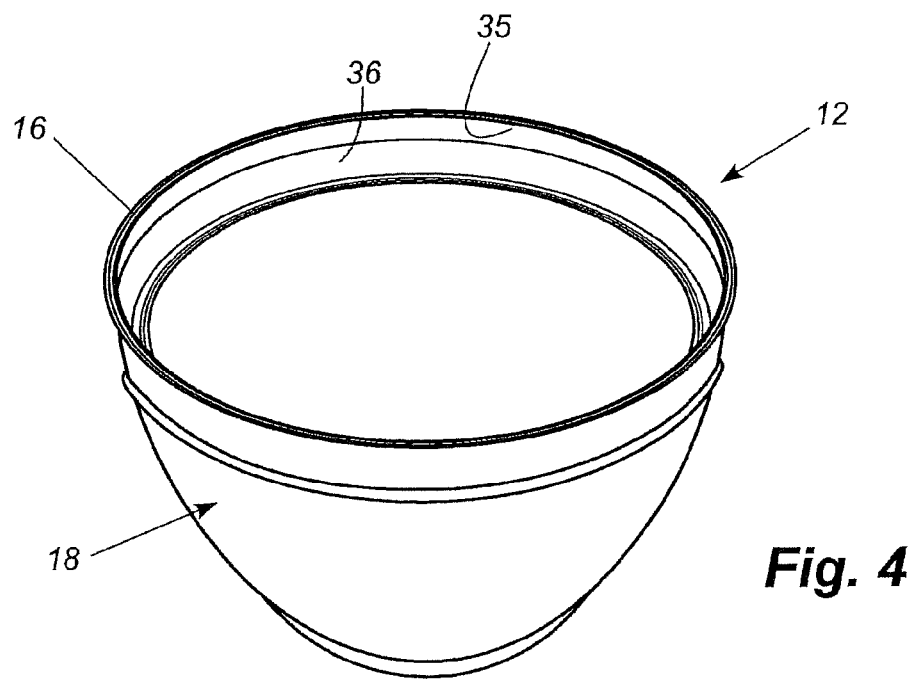
FIG. 4 is a perspective view of the container of FIG. 2.
Figure 5:
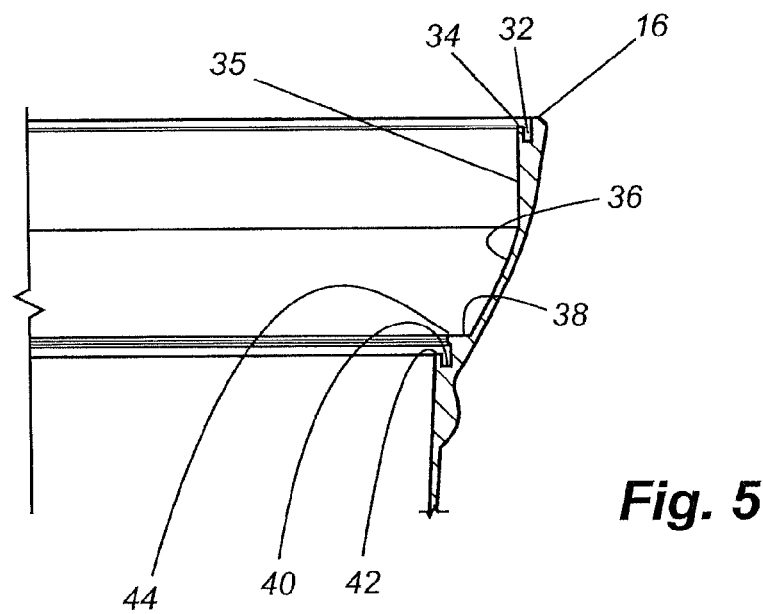
FIG. 5 is a cross-sectional view of the upper portion of the container as seen along line 5-5 of FIG. 3.
Figure 6:
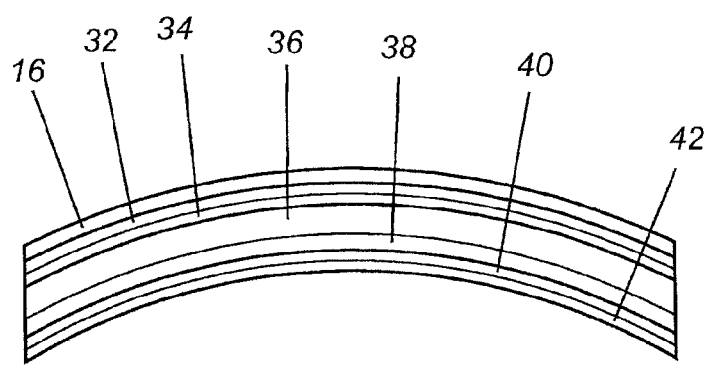
FIG. 6 is an enlarged top view of the portion of the planter indicated by the dashed rectangle 6 in FIG. 3.
Figure 9:
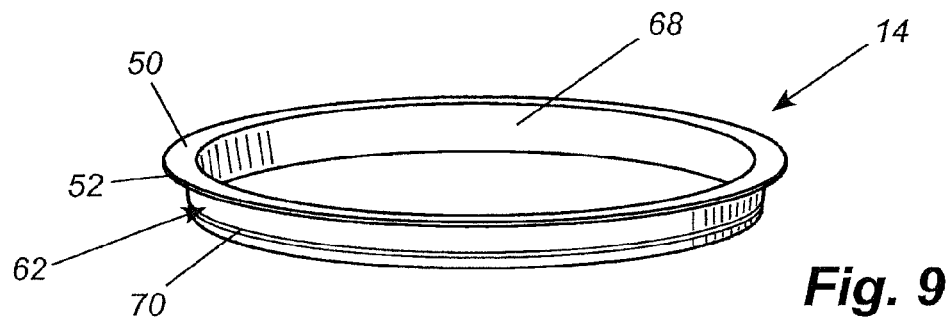
FIG. 9 is a perspective view of the rim of the planter of FIG. 1.
Figure 10:
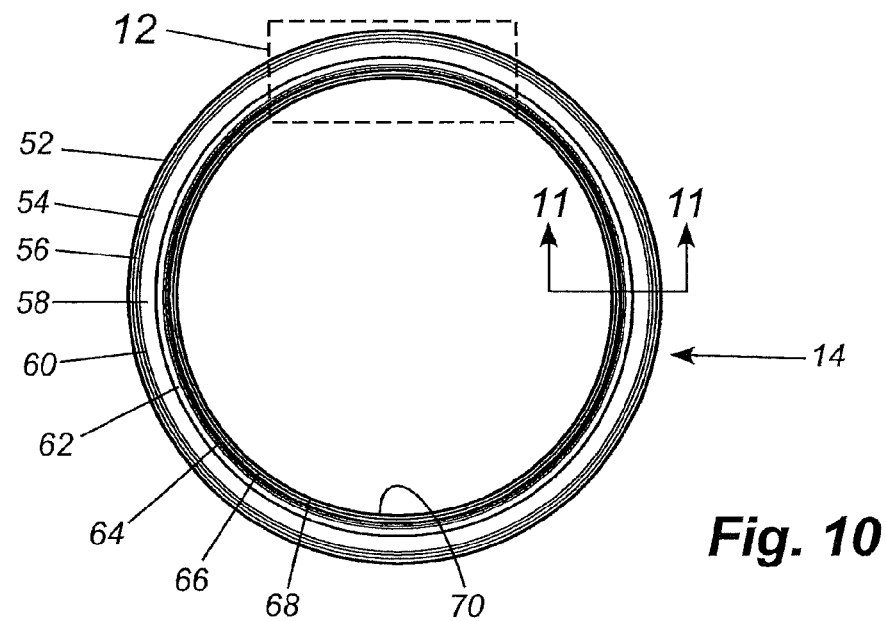
FIG. 10 is a bottom view of the rim of FIG. 9.
Figure 11:
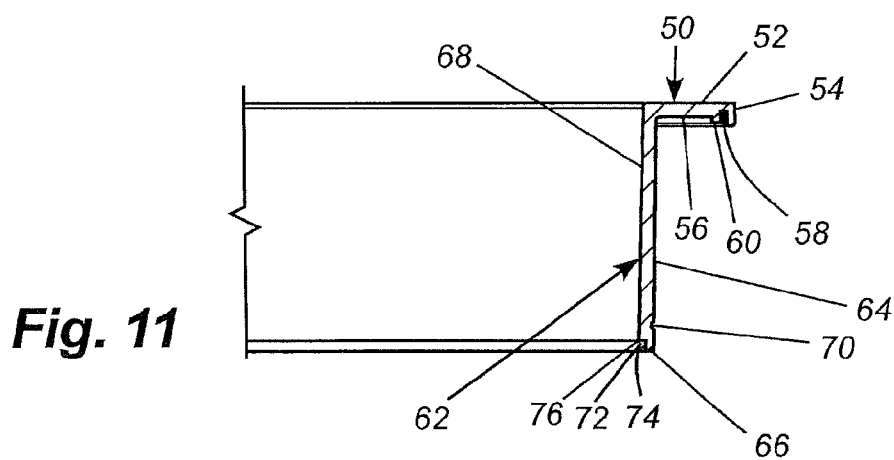
FIG. 11 is a cross-sectional view as seen along line 11-11 of FIG. 10.
Figure 12:
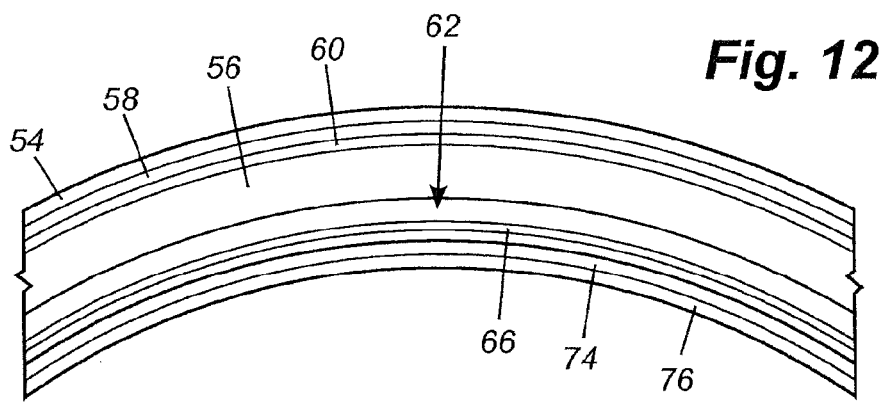
FIG. 12 is an enlarged bottom view of the portion of the rim located by the dashed rectangle 12 in FIG. 10.

FIG. 2 is a side view of the container 12. The container 12 has an upper end 16 (also hereinafter "upper surface 16"), a side wall 18 extending downward and inward from the upper end 16, and a bottom 20. The side wall 18 includes a convex upper side wall portion 22, a convex intermediate side wall portion 24, and a convex lower side wall portion 26. A first decorative circumferential ring 28 is optionally provided at the juncture between the upper and intermediate side wall portions 22, 24. A second decorative circumferential ring 30 is optionally provided at the juncture between the intermediate and lower side wall portions 24, 26. The outward shape and appearance of the container 12 is determined largely by aesthetic considerations and does not form a part of the invention. The wall portions 22, 24, and 26 may be straight or concave instead of the illustrated convex shape. More or fewer decorative elements along the lines of the circumferential rings 28, 30 may be provided.

Referring now to FIGS. 3-8, the configuration of the inner portion at the upper end 16 of the container 12 is depicted. Just inward of the upper surface 16 of the container 12, an annular recess 32 is formed. Just inward of the annular recess 32 is an upwardly extending protrusion 34. An upper interior wall portion 35 (FIGS. 4 and 5) extend downward from the protrusion 34. An angled interior wall portion 36 extends downward and inward from the lower end of the upper interior wall portion 35. An inwardly projecting ledge 38 extends radially inward from the lower end of the angled interior wall portion 36. An annular channel 40 is formed in the upper surface of the ledge 38. An upwardly extending rib 42 defines the interior wall of the annular channel 40. An inwardly extending interlock projection 44 is formed on the ledge 38 above the channel 40 and extending part way over the channel 40.

FIGS. 9-14 illustrate the rim insert 14. The rim insert 14 includes an annular flange 50 whose upper surface 52 forms the upper surface of the rim insert 14. The flange 50 has a downwardly extending outer peripheral edge wall 54 and a lower flange surface 56. An upwardly extending annular groove 58 is defined in the lower rim surface 56 just inward of the periphery. A downwardly extending annular boss 60 is formed on the lower rim surface 56 adjacent the annular groove 58.

A side wall 62 of the ring insert 14 extends downward from the inner periphery of the flange 50. The side wall 62 has an outward facing surface 64, a bottom edge 66, and an inwardly facing surface 68. An interlock recess 70 is formed in the outer surface 64 of the side wall 62 adjacent its lower end. The bottom edge 66 of the side wall 62 has a notch 72 so that a narrow leg 74 extends downward from the outer portion of the side wall 62. The notch defines an upper wall 76 (also hereinafter "upper surface 76").

Figure 15:
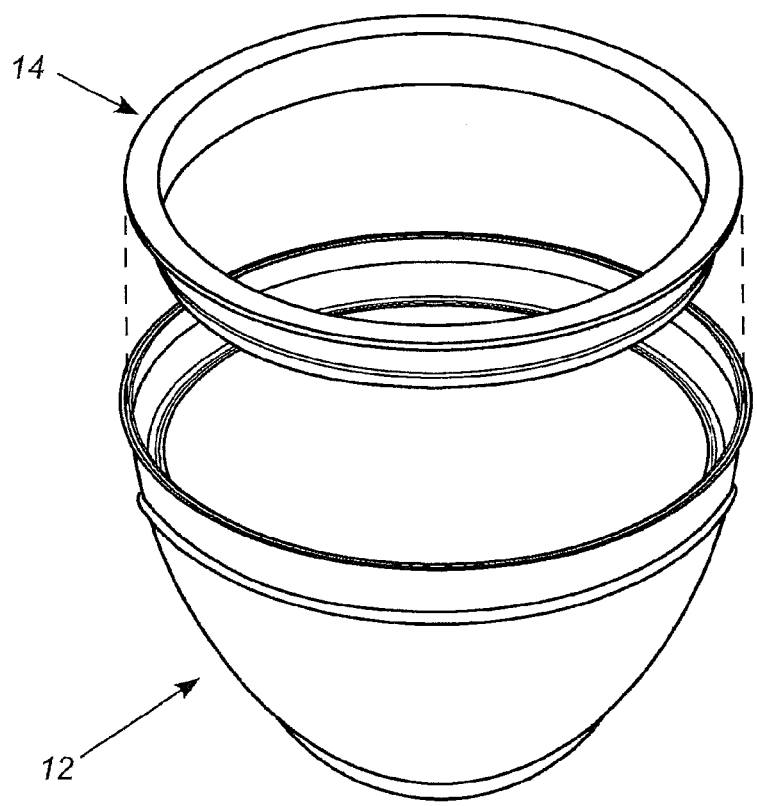
FIG. 15 is an exploded perspective view of the rim and container of the planter of FIG. 1.
Figure 13:
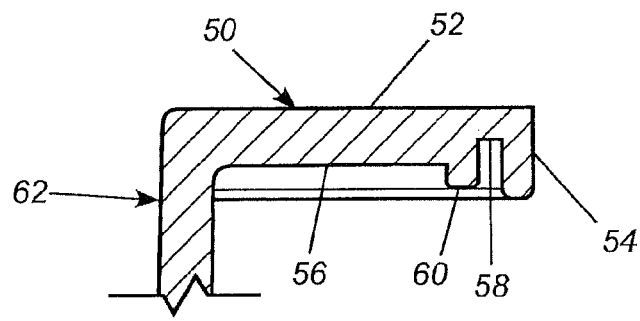
FIG. 13 is a view of the upper portion of the rim cross section, enlarged to show more detail.
Figure 14:
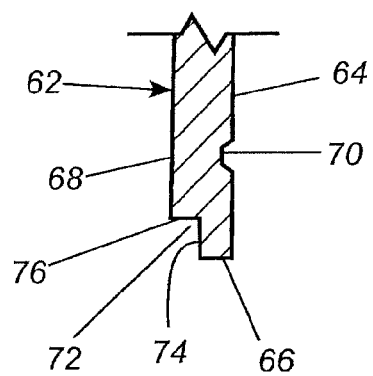
FIG. 14 is a view of the bottom portion of the rim cross section, enlarged to show more detail.
Figure 7:
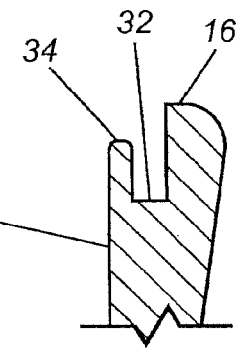
FIG. 7 is a view of the upper portion of the container cross section, enlarged to show more detail.
Figure 8:
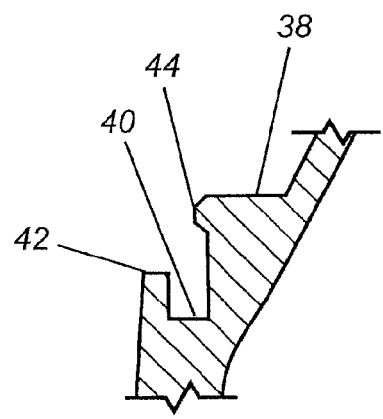
FIG. 8 is a view of a lower portion of the container cross section, enlarged to show more detail.
Figure 16:
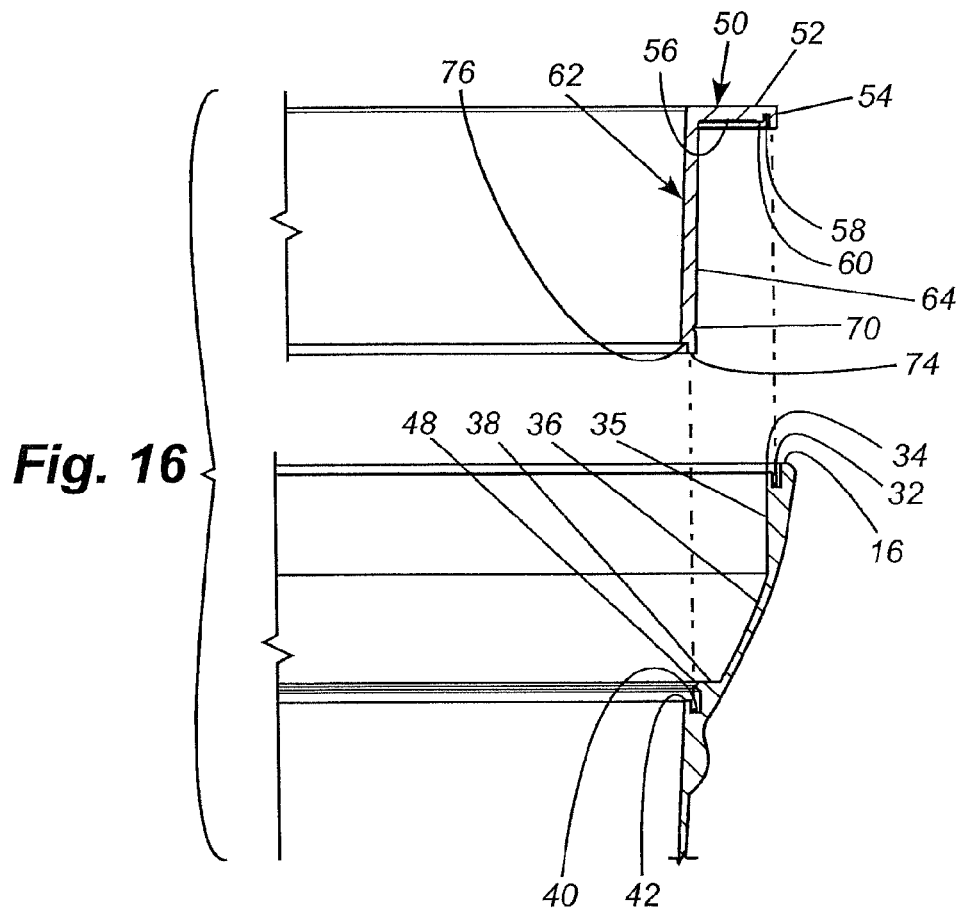
FIG. 16 is an exploded cross-sectional view of the rim and container of the planter of FIG. 1.
Figure 17:
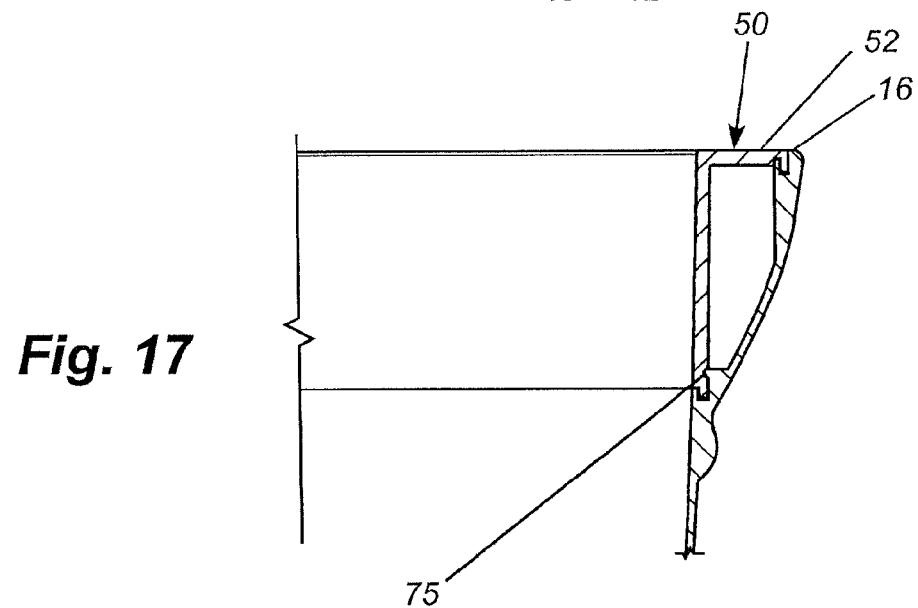
FIG. 17 is an assembled cross-sectional view of the rim and container of the planter of FIG. 1.

As shown in FIG. 15, the rim insert 14 is inserted downward into the upper end of the container 12, where it snaps into place. A structure by which the rim insert 14 and container 12 interlock is shown in FIGS. 16 and 17. Referring first to FIG. 16, the narrow leg 74 at the lower end of the side wall 62 of the rim insert 14 fits into the annular channel 40 of the inwardly projecting ledge 38 of the container 12. The upper wall 76 of the notch 72 in the lower end of the side wall 62 of the rim insert 14 confronts the upwardly extending tab of the container 12. As the lower end of the side wall 62 engages the annular channel 40, the inwardly projecting interlock projection 44 of the container 12 snaps into the cooperating interlock recess 70 in the outer surface 64 of the side wall 62 of the rim insert 14 to lock the rim insert 14 in place.

Simultaneously, at the upper end of the rim insert 14 the outer peripheral edge 54 of the annular flange 50 of the rim insert 14 fits downward into the annular recess 32 in the upper end of the container 12. The annular groove 58 in the lower surface 56 of the flange 50 receives the protrusion 34 at the upper end of the container 12.

A cross section of the assembled container 12 and rim insert 14 is shown in FIG. 17. It will be seen that the upper surface 52 of the rim insert 14 is substantially flush with, or above, the upper surface 16 of the container 12. Thus, despite having a separate rim portion that engages the upper end of the container 12, there is no visible seam as viewed from the side. Rather, the seam between the rim insert 14 and the container 12 is on the top surface of the planter 10, where it is more easily obscured by the plant and less visible to a viewer.

As will be appreciated, the leg 74 at the lower end of the side wall 62 (also, hereinafter "wall 62") of the rim insert 14 is located and configured to engage the annular channel 40 of the inwardly projecting ledge 38 of the container 12 when the two parts are assembled. Similarly, the inwardly projecting interlock projection 44 of the container 12 is located and configured to engage the cooperating interlock recess 70 in the outer surface 64 of the side wall 62 of the rim insert 14 when the two parts are assembled. Further, the upper wall 76 of the notch 72 in the lower end of the side wall 62 of the rim insert 14 is located and configured to confront the upper surface of the upwardly extending rib 42 of the container 12. The outer peripheral edge 54 of the annular flange 50 of the rim insert 14 is located and configured to fit into the annular recess 32 in the upper end of the container 12. And the protrusion 34 at the upper end of the container 12 is located and configured to engage the annular groove 58 in the lower surface 56 of the flange 50.

Figure 18:
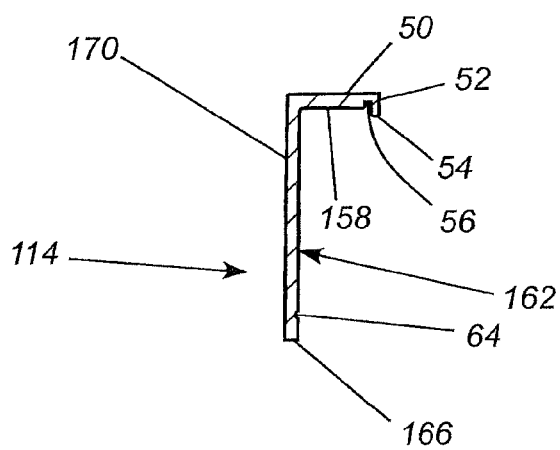
FIG. 18 is a cross-sectional view of an alternate embodiment of a rim insert.
Figure 19:
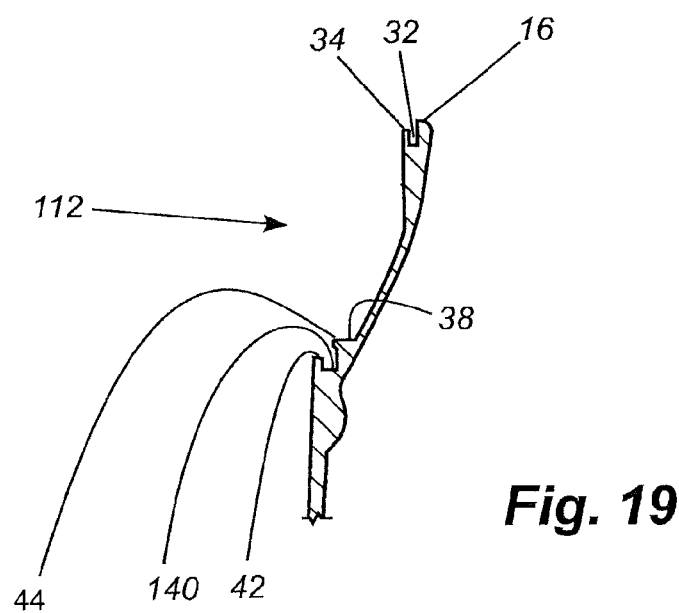
FIG. 19 is a cross-sectional view of an alternate embodiment of a container for use with the rim of FIG. 18.

FIGS. 18 and 19 illustrate alternate embodiments of a container 112 and rim insert 114. The parts of these components that are unchanged from the container 12 and rim insert 14 previously disclosed are identified by the same reference numerals previously used, while the parts of these components that differ from the previously disclosed container 12 and rim insert 14 have a "1" prefix.

FIG. 18 shows a rim insert 114 that differs from the rim insert 14 in that it lacks the downwardly extending annular boss 60 on the lower rim surface 156 adjacent the annular groove 58. The function of the annular boss 60 is to define a deeper groove 58 without having to make the entire flange 50 of the rim insert 114 thicker. Thus, it is possible to eliminate the boss 60 and just have a shallower notch within which to receive the protrusion 34, or to make the entire flange 50 thicker.

Similarly, the bottom edge 166 of the wall 62 (also herein after, the "lower end 166 of the wall 162") of the rim insert 114 lacks the notch 72 of the previous embodiment 14. The purpose of the notch 72 is to create a leg 74 that is narrower than the wall 62 and to provide a surface 76 for confronting a cooperating element on the container 12 to limit downward movement of the rim insert 14. However, it is possible to eliminate the notch 72, provide a wider annular channel 140 in the container 112, and simply insert the entire lower end 166 of the wall 162 into the wider annular channel 140. In this case, the confrontation between the lower end 166 of the wall 162 and the base of the channel 140 limits downward movement of the rim insert 114.

The container 12 and rim insert 14 of the disclosed embodiment can be formed by injection molding the two pieces separately in the manner well known to those skilled in the art. According to one manufacturing method, however, the rim insert 14 is permitted to cool to room temperature. The container 12 is permitted to cool to a temperature above ambient temperature but at or below a temperature at which the plastic has solidified. The cooled rim insert 14 is snapped into the upper end of the hot container 12. As the container 12 continues to cool, it contracts around the rim insert 14. The contraction of the container 12 helps to create a friction or interference fit between the rim insert 14 and the container 12.

Optionally, the connection between the container 12 and the rim insert 14 can be enhanced by applying a suitable adhesive during assembly to contact points between the container 12 and the rim insert 14. For example, adhesive can be applied to the container 12 at one or more of the annular recess 32, the protrusion 34, the annular channel 40, the rib 42, and the interlock projection 44. Adhesive can also be applied to the rim insert 14 at one or more of the peripheral edge wall 54, the annular groove 58, the annular boss 60, the female interlock recess 70, the leg 74, or the upper surface 76.

Throughout this application similar structures have been referred to by different names. For example, the annular recess 32, the annular channel 40, and the annular groove 58 are all essentially forms of annular recesses. Similarly, the terms protrusion 34, rib 42, boss 60, and leg 74, all describe protruding structures. These different terms are used for convenience of description to more easily distinguish among similar structures. The different terms are not meant to imply a difference in structure or function unless the specification indicates such a distinction.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A planter comprising:
  a container having a side wall with an upper surface;
  a rim insert having a sidewall and a flange with an upper surface and a lower surface, the rim insert being configured to snap fit into the container;
  wherein, when the rim insert and container are assembled, the container sidewall upper surface extends substantially flush with the upper surface of the rim insert; and
  whereby there is no seam between the container and rim insert that is visible from the side of the container wherein: the rim insert flange has a downwardly extending edge wall; the container sidewall upper surface includes a recess; the rim insert flange edge wall sized to fit within the container sidewall upper surface recess; and wherein, when the rim insert and container are assembled, the rim insert flange edge wall is disposed within the container sidewall upper surface recess; wherein: the rim insert sidewall has a bottom edge, the bottom edge having a notch whereby a descending leg is formed; the container sidewall has an inwardly projecting ledge, the ledge having a generally horizontal upper surface; the container sidewall ledge upper surface having a channel; the rim insert sidewall bottom edge leg sized to fit within the container sidewall ledge upper surface channel; and wherein, when the rim insert and container are assembled, the rim insert sidewall bottom edge leg is disposed within the container sidewall ledge upper surface channel; wherein: the rim insert sidewall includes an interlock recess adjacent the rim insert sidewall lower end; the container sidewall ledge having an interlock projection disposed above the container sidewall ledge channel; wherein the container sidewall ledge interlock projection sized to fit within the rim insert sidewall interlock recess; and wherein, when the rim insert and container are assembled, the container sidewall ledge interlock projection is disposed within the rim insert sidewall interlock recess; wherein: the rim insert flange has a boss extending from the rim insert flange lower surface; the rim insert flange boss being spaced from the rim insert flange edge wall whereby a rim insert flange groove is created; the container sidewall upper surface includes an upwardly extending protrusion; the container sidewall upper surface protrusion sized to fit within the rim insert flange groove; and wherein, when the rim insert and container are assembled, the container sidewall upper surface protrusion is disposed within the rim insert flange groove.

2. The planter of claim 1 wherein the rim insert flange edge wall is disposed at the periphery of the rim insert flange.

3. The planter of claim 1 wherein:
  the rim insert sidewall has a bottom edge;
  the container sidewall has an inwardly projecting ledge, the ledge having a generally horizontal upper surface;
  the container sidewall ledge upper surface having a channel;
  the rim insert sidewall bottom edge sized to fit within the container sidewall ledge upper surface channel; and
  wherein, when the rim insert and container are assembled, the rim insert sidewall bottom edge is disposed within the container sidewall ledge upper surface channel.

4. The planter of claim 1 wherein:
the container sidewall is convex;
the rim insert is circular;
the container sidewall upper surface recess being an annular recess; and
the rim insert flange groove being an annular groove.

5. The planter of claim 1 wherein:
the container sidewall upper surface recess is a generally upwardly facing recess; and
the rim insert flange groove is a generally downwardly facing groove.

6. A planter comprising:
a container having a side wall with an upper surface;
a rim insert having a sidewall and a flange with an upper surface and a lower surface;
the container having at least one upwardly facing recess;
the rim insert having at least one downwardly protruding structure;
the rim insert at least one downwardly protruding structure sized to fit within the container at least one upwardly facing recess; and
wherein the rim insert is configured to be coupled to the container via a downward motion wherein: the rim insert flange has a downwardly extending edge wall, the rim insert edge wall being at least one downwardly protruding structure; the container sidewall upper surface includes a recess, the container sidewall upper surface recess being at least one upwardly facing recess; the rim insert flange edge wall sized to fit within the container sidewall upper surface recess; and wherein, when the rim insert and container are assembled, the rim insert flange edge wall is disposed within the container sidewall upper surface recess; wherein: the rim insert sidewall has a bottom edge, the bottom edge having a notch whereby a descending leg is formed, the rim insert sidewall bottom edge leg being at ~east one downwardly protruding structure; the container sidewall has an inwardly projecting ledge, the ledge having a generally horizontal upper surface; the container sidewall ledge upper surface having a channel, the container sidewall ledge upper surface channel being at least one upwardly facing recess; the rim insert sidewall bottom edge leg sized to fit within the container sidewall ledge upper surface channel; and wherein, when the rim insert and container are assembled, the rim insert sidewall bottom edge leg is disposed within the container sidewall ledge upper surface channel.

7. The planter of claim 6 wherein the rim insert sidewall is structured to be disposed within the container.

8. A method of making a planter comprising the steps of: providing a planter comprising: a container having a side wall with an upper surface; a rim insert having a sidewall and a flange with an upper surface and a lower surface, the rim insert being configured to snap fit into the container; wherein, when the rim insert and container are assembled, the container sidewall upper surface extends substantially flush with the upper surface of the rim insert; and whereby there is no seam between the container and rim insert that is visible from the side of the container; wherein: the rim insert flange has a downwardly extending edge wall; the container sidewall upper surface includes a recess; the rim insert flange edge wall sized to fit within the container sidewall upper surface recess; and wherein, when the rim insert and container are assembled, the rim insert flange edge wall is disposed within the container sidewall upper surface recess; wherein: the rim insert sidewall has a bottom edge, the bottom edge having a notch whereby a descending leg is formed; the container sidewall has an inwardly projecting ledge, the ledge having a generally horizontal upper surface; the container sidewall ledge upper surface having a channel; the rim insert sidewall bottom edge leg sized to fit within the container sidewall ledge upper surface channel; and wherein, when the rim insert and container are assembled, the rim insert sidewall bottom edge leg is disposed within the container sidewall ledge upper surface channel; wherein: the rim insert sidewall includes an interlock recess adjacent the rim insert sidewall lower end; the container sidewall ledge having an interlock projection disposed above the container sidewall ledge channel; wherein the container sidewall ledge interlock projection sized to fit within the rim insert sidewall interlock recess; and wherein, when the rim insert and container are assembled, the container sidewall ledge interlock projection is disposed within the rim insert sidewall interlock recess; wherein: the rim insert flange has a boss extending from the rim insert flange lower surface; the rim insert flange boss being spaced from the rim insert flange edge wall whereby a rim insert flange groove is created; the container sidewall upper surface includes an upwardly extending protrusion; the container sidewall upper surface protrusion sized to fit within the rim insert flange groove; and wherein, when the rim insert and container are assembled, the container sidewall upper surface protrusion is disposed within the rim insert flange groove;
vertically aligning the rim insert at least one downwardly protruding structure with the container at least one upwardly facing recess; and
moving the rim insert downwardly into the container until the rim insert at least one downwardly protruding structure is disposed within the container at least one upwardly facing recess and until the container sidewall upper surface extends substantially flush with the upper surface of the rim insert.

9. The method of claim 8 wherein, prior to the step of vertically aligning the rim insert at least one downwardly protruding structure with the container at least one upwardly facing recess, the method includes the steps of:
molding the container by an injection molding process;
molding the rim insert by an injection molding process;
allowing the rim insert to cool to room temperature; and
allowing the container to cool to a temperature above room temperature, but where the container is solidified.

10. The method of claim 9 wherein, after the step of moving the rim insert downwardly into the container until the rim insert at least one downwardly protruding structure is disposed within the container at least one upwardly facing recess, the method includes the further step of allowing the container to cool to room temperature.

11. The method of claim 8 wherein, prior to the step of moving the rim insert downwardly into the container until the rim insert at least one downwardly protruding structure is disposed within the container at least one upwardly facing recess, the method includes the step of applying an adhesive to at least one of the rim insert at least one downwardly protruding structure or the container at least one upwardly facing recess.

* * * * *